United States Patent Office 2,858,305
Patented Oct. 28, 1958

2,858,305

PROCESS FOR THE PREPARATION OF ALKYL ETHERS OF STARCH IN UNSWOLLEN GRANULE FORM

Ralph W. Kerr, Riverside, Ill., assignor to Corn Products Refining Company, New York, N. Y., a corporation of New Jersey No Drawing. Application January 26, 1956
Serial No. 561,640

8 Claims. (Cl. 260—233.3)

This invention relates to an improved process for the production of alkyl starches and to a process for preparing alkyl starches in unswollen granule state.

Alkyl ethers of starch have been known heretofore. However, they have not enjoyed any commercial success primarily because of the cost of preparation. Many of these products were either gelatinized or had become degraded during their preparation. It was generally considered necessary to either first gelatinize the starch so that etherification would take place or else to use such large amounts of alkali as catalyst that the starch became gelatinized during the reaction. Accordingly, it was difficult to obtain alkyl starches in pure form since gelatinized starch products are not easily separated from large quantities of by-products of the reaction and from alkaline catalysts except by precipitation with a suitable organic solvent or by some other procedure, e. g., dialysis, which of course adds to the cost of their preparation.

It has generally been believed, and it has been my experience also, that alkyl esters of ortho oxy-acids, such as dimethyl sulfate, do not react, or react feebly, with starch in granule form suspended in water, unless a sufficient quantity of alkylating agent is added so that the starch granules swell or gelatinize during the treatment; a catalyst is required to promote the reaction so that it takes place in an efficient manner within practical limits of time. Catalysts or promotors suitable for this etherification are either highly acidic, e. g., $SOCl_2$, or they are highly basic, e. g., NaOH. However, past experience has shown that acidic catalysts tend to degrade the carbohydrate molecule by splitting glucoside linkages and alkaline catalysts, when added in amounts sufficient to promote the reaction to within practical rate limits, cause the starch granules to swell or gelatinize and thus render purification of product difficult and costly. Impure alkyl starch ethers and highly degraded starch ethers have, obviously, very limited application and the transportation and use of gelatinized pastes obviously is much more costly and less convenient than the transportation and use of a starch product in conventional dry powder or pearl form.

It is an object of this invention to provide an improved process for the production of alkyl starches. Another object is to provide a method for the production of alkyl starches in unswollen granule form. Still another object is to provide a process for the production of alkyl starches whereby they can be purified readily and economically. Yet another object is to provide a method for the production of alkyl ethers of modified or derivatized starch in unswollen, granule form.

Another object is to provide as new and useful articles of commerce, pure alkyl ethers of starch in unswollen, original granule form, which may be handled, transported and used in a variety of applications in the manner which is already provided in industry and commerce for conventional grades of powdered or pearl starches.

I have discovered that alkyl starches in granule form can be prepared by reacting starch in granule form with alkyl esters of polybasic inorganic oxyacids in an aqueous medium containing an alkaline catalyst and a soluble neutral salt chemically inert to starch which inhibits granule swelling, the pH of the system being approximately 10 to 11 and the temperature not exceeding the galatinization temperature of the starch at the pH level of the reacting system and at the neutral salt concentration employed.

The temperature at which starch substrate granules would normally swell in aqueous media depends on a number of interrelated factors and accordingly, swelling temperature for starch cannot be given as a constant figure to apply to all conditions. Swelling temperature depends on the variety of starch used; for example, tapioca starch will swell, under otherwise the same conditions, at a temperature somewhat lower, 5 to 10° C., than corn starch. Derivatives of starch, for example, hydroxyethyl corn starch, or modified starches, for example, hypochlorite oxidized corn starch, will swell under otherwise the same conditions at temperatures less than the untreated starch, in this case corn starch. The alkalinity or pH value of the aqueous phase materially affects the gelatinization temperature of any starch; the higher the alkalinity, or pH value, the lower is the temperature at which the granules will swell. Time is also a factor, particularly at higher pH values. Thus, for example, corn starch is aqueous medium at pH 11 may not swell at a given temperature within one hour but after 24 hours an undesirable degree of granule swelling may take place.

However, although the temperature of starch granule swelling cannot be given as a specific value which will apply to all conditions, the effect of the variables above discussed as they alter the temperature of swelling, is now well known in the art. Accordingly, it is believed that those skilled in the art will be able to adjust the concentration of granule swelling inhibitor in accordance with the teachings herein set forth so as to prevent granule swelling during alkylation under the particular set of conditions chosen.

Broadly, the process of this invention is as follows: Starch, or a starch product, in the unswollen granule state, is stirred into about a 10 percent to 25 percent aqueous solution of a neutral salt, such as $Na_2SO_4$, into which solution has also been dissolved, about 0.5 to 0.10 mole of caustic, such as NaOH, for each molar weight (162 grams) of starch added. Although the pH of this slurry may be about 11, and a substantial excess of free caustic is present, the starch does not gelatinize, particularly at lower temperatures, e. g., 25 to 30° C. Then with vigorous stirring and while heating to a convenient reaction temperature, e. g., 40 to 50° C., sufficient etherifying agent, e. g., dimethyl sulfate, is added to depress the pH level to about 10.5. Thereafter, both the etherifying agent and the caustic (as an aqueous solution) are added simultaneously, and at such rates so as to maintain the pH level of the reaction mixture at about 10 to 11.

After the reagents have been added and the mixture is up to temperature, the reaction is allowed to proceed until a substantial portion of the reagent has reacted with the starch. This may require from about 2 to 24 hours depending on the etherifying agent chosen and the temperature of reaction.

The alkyl starch, still in the unswollen granule state, is then resuspended, neutralized by adding an acid, filtered, thoroughly washed with water, and dried.

Products with greatly improved paste properties for several applications have thus been prepared in the unswollen granule state in the D. S. range of about 0.03 to 0.10. This may require the addition of about 0.05 to 0.30 mole of etherifying agent and the use of a total of about 0.05 to 0.30 mole of caustic alkali per molar weight (162 grams) of starch treated.

Temperatures within the range of about 40 to 95° C. have been employed. In the lower temperature range, the concentration of added salt, e. g., $Na_2SO_4$, may be 10 percent by weight in the aqueous phase to completely repress granule swelling during the reaction; in the higher temperature ranges, as high as 25 percent added salt may be required. In common with most chemical reactions, the higher the temperature, the higher is the reaction rate.

The added caustic should preferably be run into the reaction mixture slowly with stirring, and as a dilute aqueous solution, e. g., a normal solution of NaOH. This is so as to avoid local high concentrations of alkali which would tend to swell a small proportion of the starch granules. However, where large proportions of alkali are required to maintain the reaction pH at the desired level of about 10.5, the effect of this added alkali solution in reducing the actual concentration of granule swelling inhibitor, e. g., $Na_2SO_4$, in the aqueous phase must be taken into consideration, and in those cases it may be necessary to add further quantities of the inhibitor, than those recommended above, as the reaction medium becomes progressively diluted by the water added as the caustic solution.

Various types of starch, such as corn, grain sorghum, tapioca, wheat and potato starches and various modifications of starch, such as thin-boiling starches, made by acid or an oxidizing treatment as well as starch derivatives, such as, for example, hydroxyalkyl starch ethers, may be used as substrate in practicing this invention, providing in all cases that they are in the unswollen granule state to begin with and providing the amount of added swelling inhibitor, e. g., $Na_2SO_4$, is adjusted to counteract the tendency of these starches, or starch products to swell in aqueous alkaline reaction medium. The term "starch," as used herein, is intended to include all of the foregoing products.

Various alkalis or alkaline materials may be used to catalyze or promote the etherification reaction. For example, NaOH, KOH, lime, sodium carbonate and nitrogeneous bases may be employed.

Any sufficiently soluble salt, chemically inert to starch, such as sodium sulfate, potassium sulfate, sodium chloride, ammonium chloride and the like may be used to inhibit granule swelling of the starch and alkyl starch.

Various alkyl esters of polybasic inorganic oxy-acids may be used as etherifying agents. Although for reasons of economy (cost of reagent and etherification efficiency), the dialkyl sulfates are the preferred reagents, it is within the scope of this invention to use the alkyl esters of other oxy-acids which will react with starch in aqueous medium under nongelatinizing conditions. Among those which are satisfactory are dimethyl sulfate, triisopropyl borate, tributyl phosphate, tetraethylorthosilicate, diethyl sulfate, triethyl phosphite, and trihexyl phosphite.

This invention is further illustrated by several examples which follow. However, it is understood that these examples are in no sense limiting but are given additionally to elucidate some of the general principles of this invention hereinabove set forth.

EXAMPLE 1

*Preparation of the methyl ether of starch in the unswollen granule state by the use of dimethyl sulfate*

One mole of corn starch (162 grams, dry basis) was stirred into 220 ml. of water into which had been dissolved 22 grams of $Na_2SO_4$ and 0.05 mole of NaOH. The pH was 11 and the temperature 30° C.

With vigorous stirring, a measured quantity of dimethyl sulfate was added to depress the pH level of the reaction medium to 10, while heating to a reaction temperature of 40° C. Thereafter, dimethyl sulfate and a normal solution of NaOH were added simultaneously and in such proportions that the pH level of the reaction mixture was 10, until a total of 18.9 grams (0.15 mole) of dimethyl sulfate had been added. The addition of 117 ml. (0.117 mole) of N NaOH was required to maintain the pH at 10. Accordingly, a total of 0.167 mole of NaOH was employed.

Periodically, as shown in Table I, samples were removed, filtered by suction, washed on the filter with water then resuspended in water, adjusted to pH 7 with HCl, filtered by suction and again washed with water on the filter. All samples of the product were in the unswollen granule state and filtered readily from an aqueous slurry.

For analysis, as shown in the table, a portion of each sample was additionally purified by stirring into methanol, filtering and washing on the filter with 3 portions of methanol using a total of 600 ml. of methanol per 100 grams of product purified. Finally, the methanol extracted product was washed with 200 ml. of water per 100 grams product, filtered and dried for at least 24 hours.

TABLE I.—REACTION OF CORN STARCH WITH DIMETHYL SULFATE

| Example No. 1 | Reaction Time at 40° C., Hr | Reaction, pH | Methoxyl, percent | Methyl Ether, D. S. |
|---|---|---|---|---|
| A | 2 | 10.1 | 1.29 | 0.068 |
| B | 4 | 10.1 | 1.36 | 0.070 |
| C | 6 | 10.2 | 1.37 | 0.071 |
| D | 23 | 10.0 | 1.49 | 0.078 |

D. S., degree of substitution, is given as the average number of ether groups per anhydroglucose unit in the starch molecule.

It will be observed that since a 0.15 molar equivalent of reagent was used and since a product of degree of substitution (D. S.) of 0.078 was obtained, the reaction efficiency was $0.078/0.15 \times 100$, or 53 percent of theoretical. Efficiencies which can be calculated from analytical data supplied in the prior art with starch and dimethyl sulfate, are of the order of 30 percent or less (Haworth and co-workers, J. Chem. Soc., 1932 to 1937).

It will also be observed that under the conditions used in this example, the reaction rate is relatively rapid, and is approximately 85 percent as complete in two hours, as it is in 23 hours.

All of the products of Example 1 (A to D) gelatinized in water to form pastes of improved properties compared to the untreated starch. The pastes were viscous, more free flowing and showed much less tendency to retrograde or set to irreversible gels when cooled and stored at room temperature.

EXAMPLE 2

*Methylation of a thin boiling starch with dimethyl sulfate*

A starch product in the unswollen granule state which had been oxidized with hypochlorite to reduce its paste viscosity into the range of a commercial, thin boiling grade, was methylated by substantially the same procedures given in Example 1. Using a ratio of 0.15 mole of dimethyl sulfate and 0.137 mole NaOH, a reaction pH of 10 and temperature of 40° C., a product was obtained at 2 hours reaction time which when purified by procedures given in Example 1 showed on analysis, 1.74 percent methoxyl which is equivalent to a D. S. of 0.092. This represents a reaction efficiency of 61 percent of theoretical.

The product, still in the unswollen granule form, showed desirably improved colloidal properties, such as sol clarity, long flow and viscosity stability when gelatinized by heating in water and cooling. The product was additionally treated as shown in Example 3.

EXAMPLE 3

*Preparation of a cold water dispersible, methylated starch product*

The product of Example 2 was made into a slurry using 240 grams of starch product, 940 ml. of water and 12 grams of boric acid was added. This slurry was fed to valley between two rollers heated with steam at 110 pounds steam pressure, whereon the starch product was gelatinized and dried to a thin flake. The flake was ground to powder of mesh size between about 30 and 100 standard wire screen mesh.

This product dispersed readily when stirred into cold water to form a colloidally stable sizing solution. When fabrics were sized with this solution, dried and ironed, it was observed that the product of Example 3 had approximately twice the sizing value, compared on a dry weight basis, to a commercial, cold water dispersible commercially available laundry starch. Moreover, the finish on the fabric was more pliable and natural appearing than that of the commercial product. In addition, fabrics, particularly colored fabrics, showed much less tendency to water spot when sized with the methylated starch product. Water spotting is an undesirable effect observed with many laundry starches when fabrics are sized with solutions or dispersions thereof, the fabrics dried and then sprinkled with water preparatory to ironing; in general, each droplet of water sprinkled onto the fabrics, sized with cold water dispersible laundry starches of the prior art, leaves a ring or mark as it evaporates and presents a mottled and highly unsatisfactory appearance on ironing.

It is believed that the methyl groups, while aiding the starch molecules in the granule to disaggregate and to remain dispersed in aqueous media, blocked off a sufficient number of hydrophilic hydroxyl groups in the starch molecule so that the tendency of these molecules to migrate when applied to fabrics and moistened with water was reduced to the extent that the aforementioned water spots, or evaporation marks, were not discernible.

EXAMPLE 4

*Reaction of corn starch with tributyl phosphate*

Corn starch was treated in a manner as set forth in Example 1, but using 26.6 grams (0.2 mole) of tributyl phosphate, 0.05 mole of NaOH, a reaction pH of 10.6 and a reaction temperature of 45° C. After 23 hours reaction time a sample purified as set forth in Example 1, showed on analysis 2.34 percent butoxyl, which is equivalent to a D. S. of 0.054.

Analysis for total phosphorus gave 0.01 percent, dry basis which is of the same order of magnitude (0.03 percent) as the untreated corn starch used. These results show that the reaction between starch and tributyl phosphate was to alkylate the starch to produce a starch butyl ether thusly:

$$3ROH + (C_4H_9O)_3PO \rightarrow 3ROC_4H_9 + H_3PO_4$$

This is an unanticipated result since from the prior art on the interaction of alcohols and alkyl phosphates, one would have expected a transesterification reaction, if any, to occur.

The product was in the unswollen granule form. A paste formed by gelatinizing the product in boiling water was less cohesive and more "short" in character than a paste formed from the methyl starch in Example 1. This would be expected to result because of the greater hydrophobicity of the butyl compared to the methyl group.

EXAMPLE 5

*Reaction of starch with tetraethyl orthosilicate*

162 grams, dry basis, of corn starch was stirred into 220 ml. of water into which had been dissolved 22 grams of $Na_2SO_4$ and 0.05 mole NaOH. The pH value was 10.9. With stirring, and while heating to 45° C. tetraethyl orthosilicate was added dropwise depressing the pH to 10.5. Then additional tetraethyl orthosilicate and normal NaOH solution were added dropwise and in such proportions as to maintain the pH value of the slurry at 10.5 to 10.6. In all, 31.2 grams (0.15 mole) of tetraethyl orthosilicate was added.

Temperature of the reaction was maintained at 45 to 50° C. and additional normal NaOH solution was added to maintain the pH at 10.6. In all, 0.18 mole of NaOH was present. After 23 hours at reaction temperature, the slurry was filtered with suction and washed on the filter with four, 200 ml. portions of water. The cake was taken up in 500 ml. of water and the slurry pH was 11.5. The slurry was filtered and again washed on the filter with four, 200 ml. portions of water. The cake was again taken up in 500 ml. of water; the slurry pH which was 10.6 was adjusted to pH 7.0 by adding 2.7 ml. of normal HCl. The slurry was filtered and washed on the filter with two, 100 ml. portions of water.

For analysis, the product in the unswollen granule form, was washed by stirring into 500 ml. of methanol. The slurry was filtered, washed on the filter with two, 200 ml. portions of methanol and the methanol was removed by washing the filter cake with two, 400 ml. portions of water. The product was air dried.

Weight=177 grams at 12 percent moisture content
Ethoxyl=0.23 percent, dry basis

Total ash of the product was found by analysis to be 0.04 percent which is substantially the value for untreated corn starch, indicating that the reaction was to form an ethyl ether of starch and not a silicate ester or ethyl silicate ester of the carbohydrate.

EXAMPLE 6

*Reaction of starch with triisopropyl borate*

162 grams, dry basis, of corn starch was suspended in 220 ml. of water into which had been dissolved 22 grams $Na_2SO_4$ and 0.05 mole of NaOH. The pH value of the slurry was 10.8. Then with vigorous stirring and as the temperature was raised to 40° C., 17.4 grams (0.15 mole) of triisopropyl borate was added dropwise. Within about 15 minutes the pH value of the reaction mixture began to drop below 10 and a normal solution of NaOH was added to maintain the pH value at about 10.5. In this way 120 ml. of N NaOH was added, making a total addition in all of 0.17 mole of NaOH.

After 2.5 hours the reaction mixture was filtered and the cake was washed on the filter with two, 200 ml. portions of water. The cake was resuspended with stirring in 300 ml. of water. After about 30 minutes, the slurry at pH 10.9 was filtered and the cake was washed on the filter with two, 200 ml. portions of water. The cake was again taken up in 300 ml. of water and this time the pH of the slurry was 10.7. Hydrochloric acid was added to adjust the pH to 7.0. The slurry was filtered and the cake was washed on the filter with two, 200 ml. portions of water. The cake was air dried and weighed 175.5 grams at 10.38 percent moisture content. The starch product was in the unswollen granule form.

Analysis of the product showed 0.54 percent isopropyl, which is equivalent to a D. S. of 0.02 as isopropyl ether groups. By analysis of the product, boron was found in only trace amounts, the actual value being 0.007 percent.

EXAMPLE 7

*Reaction of starch with triisopropyl borate*

Example 6 was repeated with the exceptions that the reaction temperature was allowed to rise to 55° C. and that the reaction was terminated at the end of about 15 minutes by cooling to room temperature followed by filtration. Product was purified by the procedure given in Example 6.

Analysis of the product showed 0.79 percent isopropyl which is equivalent to a D. S. of 0.03, as isopropyl ether groups.

By analysis boron was again found only in trace amounts, the actual value being 0.009 percent.

The principal advantage of this invention is that methods are provided for etherifying starch with simple hydrocarbon groups in a relatively efficient manner, and by such relatively simple methods that ordinary equipment usually found in starch processing plants, such as open treating tubs, starch filters and starch dryers may be used to prepare the starch ethers and to purify them.

The reagents proposed for making these simple alkyl ethers of starch, such as, for example, methyl starch, are very nearly all either relatively low vapor pressure liquids or solids. Therefore, closed reactors of special design or pressure reactors are unnecessary. The starch is maintained in the unswollen granule state throughout the process thus permitting the use of water as the reaction medium to control the reaction and the use of water and ordinary starch filters to recover, wash and purify the product from deleterious side products and unused reagents, in contrast to prior art processes for producing alkyl ethers which have used starch gelatinized in aqueous alkaline media.

I claim:

1. A process for producing alkyl ethers of starch in unswollen granule form which comprises reacting starch in unswollen granule form with an alkyl ester of a polybasic inorganic oxy-acid in aqueous medium containing sodium hydroxide catalyst and sodium sulfate to inhibit starch granule swelling and recovering the alkyl starch, the pH of the system being maintained at about 10 to 11 during etherification and the temperature not exceeding the gelatinization temperature of the starch in the reaction medium; alkyl group of said ether and ester containing from 1 to 4 carbon atoms.

2. Process according to claim 1 wherein the inhibitor is present in amount about 10 to about 25 percent and the temperature does not exceed about 95° C.

3. Process according to claim 1 wherein the alkyl ester is dimethyl sulfate.

4. Process according to claim 1 wherein the alkyl ester is diethyl sulfate.

5. Process according to claim 1 wherein the alkyl ester is triisopropyl borate.

6. Process according to claim 1 wherein the alkyl ester is tributyl phosphate.

7. Process according to claim 1 wherein the alkyl ester is tetraethylorthosilicate.

8. Process of producing a cold water dispersible starch ether which comprises rapidly drying an aqueous slurry of an alkyl starch containing added boric acid, the alkyl group of said alkyl starch containing 1 to 4 carbon atoms.

References Cited in the file of this patent

UNITED STATES PATENTS

| | | |
|---|---|---|
| 2,116,867 | Kreimeier et al. | May 10, 1938 |
| 2,516,634 | Kesler et al. | July 25, 1950 |
| 2,626,257 | Caldwell et al. | Jan. 20, 1953 |

FOREIGN PATENTS

| | | |
|---|---|---|
| 713,750 | Great Britain | Aug. 18, 1954 |